(12) United States Patent
Khurana et al.

(10) Patent No.: US 11,847,173 B2
(45) Date of Patent: Dec. 19, 2023

(54) SYSTEM AND METHOD OF FACILITATING PUBLISHING AND VERIFICATION OF DIGITAL DOCUMENTS ON A DISTRIBUTED LEDGER

(71) Applicants: Pawan Khurana, Gurgaon (IN); Rajesh Ranjan, Princeton, NJ (US)

(72) Inventors: Pawan Khurana, Gurgaon (IN); Rajesh Ranjan, Princeton, NJ (US)

( * ) Notice: Subject to any disclaimer, the term of this patent is extended or adjusted under 35 U.S.C. 154(b) by 6 days.

(21) Appl. No.: 17/666,047

(22) Filed: Feb. 7, 2022

(65) Prior Publication Data
US 2022/0253483 A1 Aug. 11, 2022

Related U.S. Application Data

(60) Provisional application No. 63/146,865, filed on Feb. 8, 2021.

(51) Int. Cl.
*G06F 16/908* (2019.01)
*H04L 9/32* (2006.01)
*G06F 16/955* (2019.01)
*H04L 9/00* (2022.01)

(52) U.S. Cl.
CPC .......... *G06F 16/908* (2019.01); *G06F 16/955* (2019.01); *H04L 9/3263* (2013.01); *H04L 9/50* (2022.05)

(58) Field of Classification Search
CPC .............................. G06F 16/908; G06F 16/955
See application file for complete search history.

(56) References Cited

U.S. PATENT DOCUMENTS 11,463,433 B1 * 10/2022 Chiruvolu ............. H04L 9/3213

\* cited by examiner

*Primary Examiner* — Baoquoc N To
(74) *Attorney, Agent, or Firm* — Holzer Patel Drennan

(57) ABSTRACT

Systems and methods are provided for creating the composite document and verifying of digital documents on blockchain. A request for verification is received from the user through at least one of a web link or button provided on the document. The composite document containing original content and corresponding embedded information in the metadata is also received along with the request. Upon a receipt of the composite document, the embedded information is retrieved from the metadata of the received document based on the characteristics of the embedded information. The retrieved document is then sent to the verification server to initiate the process of verification. Upon verification of the authenticity of the content, the results are provided to the system, which is then displayed over a user interface. Along with the authenticity of the content, the issue key of the issuing authority, if available, which issues the digital composite document, also gets verified, as an additional non-mandatory step.

3 Claims, 6 Drawing Sheets

SYSTEM AND METHOD OF FACILITATING PUBLISHING AND VERIFICATION OF DIGITAL DOCUMENTS ON A DISTRIBUTED LEDGER

CROSS-REFERENCE TO RELATED APPLICATIONS

This application claims priority to U.S. Provisional Application No. 63/146,865, entitled "SYSTEM AND METHOD OF FACILITATING PUBLISHING AND VERIFICATION OF DIGITAL DOCUMENTS ON A DISTRIBUTED LEDGER" and filed on Feb. 8, 2021, the entire disclosure of which is incorporated herein by reference for all purposes.

FIELD OF THE INVENTION

The present disclosure generally relates to production of self-verifiable digital documents and the verification of digital documents on a distributed ledger such as blockchain, independently of the issuer, without need of maintaining a stored copy of the content of the said document, to ensure the integrity of the document, and more specifically to the system and method of facilitating verification of digital documents based on a distributed ledger such as blockchain.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Verification of authenticity of digital documents is essential for applications including, such as, verification of the authenticity of information in accreditation documentation, personal identity documentation, government issued documents, legal documentation and the like to ensure the integrity of the document. The information may be configured in various formats such as text, image, audio, video, and so on. In many cases, to verify the digital document, the digital documents must be stored in a database or some digital storage and corresponding cryptographic hash values are published on a platform like blockchain. During the verification, a hash is calculated corresponding to the digital documents to be verified at a verification server and is matched with the published hash values. In case when both the hash values match, the electronic document is verified. In case when the cryptographic hash values do not match with the computed hash values, then the document is considered not to be an authenticated document.

The existing process of initiation of verification of a digital document is performed by clicking on a web link of the location of the stored copy of the said document, in whole or in parts, or by providing the key attributes of the document in the web link.

However, in all such cases, the document, in whole or in parts, must be stored somewhere in order to retrieve them at a later point such as to, for example, authenticate a document by way of comparing the content and the hashes As a result, issuer or its service provider always needs to maintain a copy or content of documents, in whole or in parts, for comparison and verification at the server, which causes a problem of a potential risk of data hacking. In addition, the existing verification does not include verification of the authenticity of an issuing authority. In addition the verification cannot be performed at any independent compatible verification server which doesn't have the stored copy of the content. Thus limiting the adoption and building of trust as independently verifiability on blockchain.

There is therefore a need in the art for system and method, which overcome above-mentioned and other limitations of existing approaches.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

DETAILED DESCRIPTION

Figure 1A:
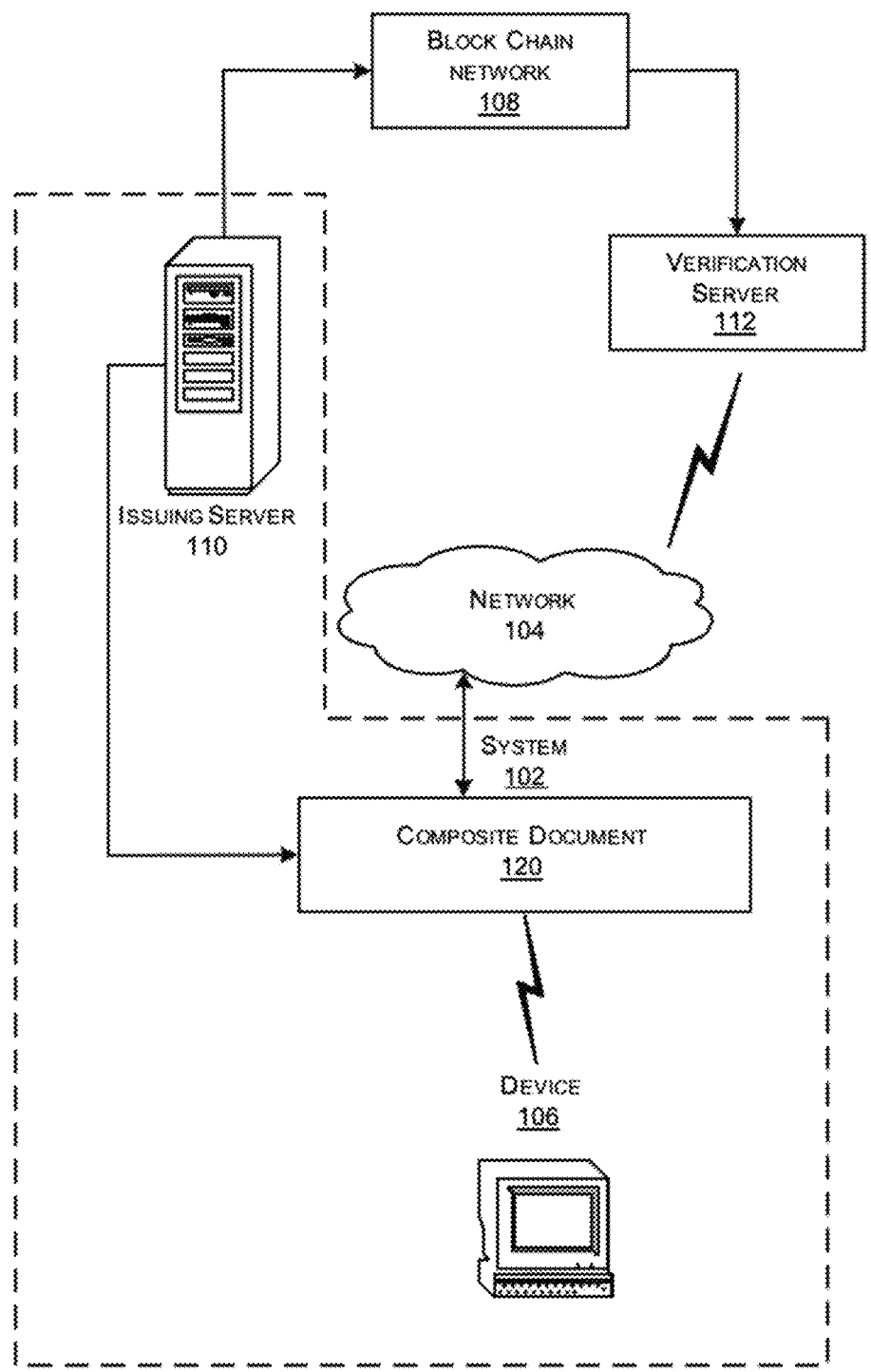
FIGS. 1A and 1B illustrate an exemplary representation of network implementation of the proposed system, in accordance with embodiments of the present disclosure.

In the following description, numerous specific details are set forth in order to provide a thorough understanding of embodiments of the present invention. It will be apparent to one skilled in the art that embodiments of the present invention may be practiced without some of these specific details.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Embodiments of the present disclosure herein relate to creating a composite document and verification of authenticity of content of the document on the distributed ledger such as blockchain. In particular, the present disclosure relates to the system and method for creating a composite document and initiating the verification of the document without any need to store the content of the digital documents in a database or a file system or an external storage. The composite document may include content such as any or a combination of text, audio, image, video, and so on and meta data information. The metadata may include, but not limited, one or more visual characteristics such as user input buttons/links, issuer identity, document content including all its elements such as image, formatting of border, logo, signatures. The meta data may also include a history in detail of all modifications made to the document, including authorial, ownership, temporal and other descriptive information. The metadata may be configured as human readable as well as machine readable.

The digital documents may be associated with, for example but not limited to, academic credentials/records, government documents, workforce credentials/records, contract law, medicine, real estate transactions and any field in which either the user wants to verify the authenticity of the document on the distributed ledger e.g., blockchain.

The verification server facilitates users to verify the contents and issuer's identity of the uploaded document. In the verification of the document, the documents may be processed to generate a one way cryptographic hash values. The cryptographic hash may be of a single document or a root hash of a merkle tree made of cryptographic hashes of multiple documents that are hashed and published on blockchain. The one way cryptographic hash values allows the verification of the authenticity of the document in a secured manner. According to the present disclosure, the composite document may include the content as well as the meta data information being embedded in the document. The content may refer to the information which is human-readable format such as a portable document format ("PDF"), the MICROSOFT® WORD® docx, and so on, whereas the embedded information includes meta data corresponding to transaction details of the blockchain network such as but not limited to, hash values, public keys of the issuing authority, and blockchain transaction ID when the hash of the document gets published. The meta data may be organized in the JavaScript Object Notation (or "JSON") or extensible markup language ("XML") and so on. The hash values are extracted from meta data of the document, which is then matched with the cryptographic hash of the documents obtained through a blockchain network where the hash of the document was published at the time of issuance of the document. In case, when the match is found, the document is verified and considered as an authenticated document.

Figure 1B:
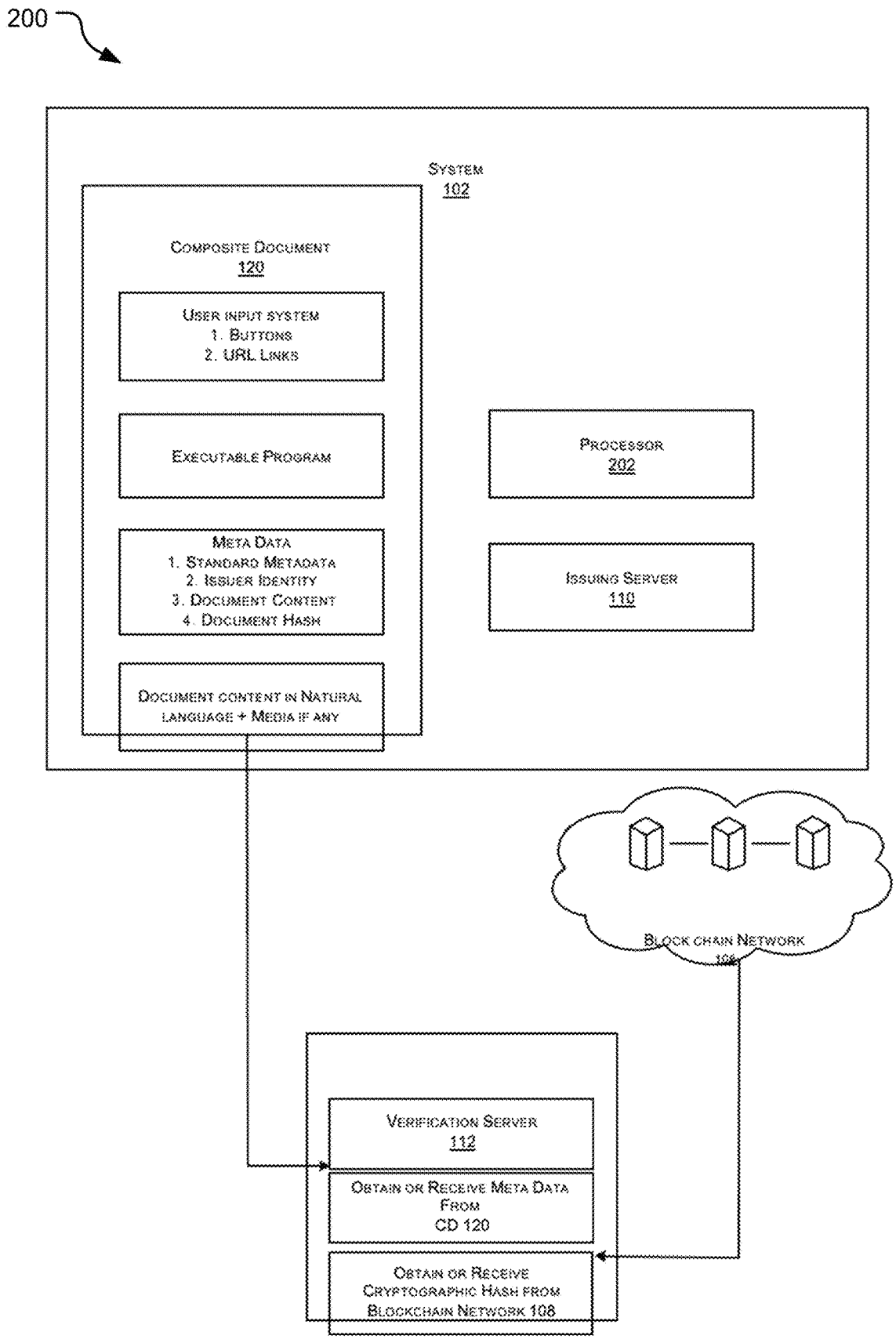

FIGS. 1A and 1B illustrate exemplary representations of network implementation of the proposed system, in accordance with embodiments of the present disclosure. The system 102 facilitates the creation/generation of composite digital document 120 and the verification of the said digital document based on a blockchain network 108. In an exemplary embodiment, the system 102 configured as a combination of issuing server 110, composite document 120 and computing device 106, whereas the computing device 106 can be operatively configured with an issuing server 110. The issuing server 110 may be operated by an issuing authority such as university, an institute, a company, a government organization, or any such organization or a service provider appointed by any such organisation. The computing device 106 can include a variety of computing systems, including but not limited to, a laptop computer, a desktop computer, a notebook, a workstation, a portable computer, a personal digital assistant, a handheld device and a mobile device or a cloud platform (storage/server/compute instance).

In an embodiment, the network 104 can be a wireless network, a wired network or a combination thereof that can be implemented as one of the different types of networks, such as Intranet, Local Area Network (LAN), Wide Area Network (WAN), Internet, and the like. Further, the network 104 can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), Automatic repeat request (ARQ), and the like.

In an embodiment, the issuing server 110 generates and issues a copy of the composite document 120 to a user, which can be verified at a later stage, where the issued/composite document contains the content embedded with the meta data as well as executable program storing one or more executable instructions, where the one or more executable instructions are executed by the processor 202 causing the processor to perform one or more actions according to the present disclosure. The composite document 120 is stored at the computing device. Upon receiving the user input, the executable instructions when executed by processor, process the composite document containing content along with the meta data.

According to the embodiment, a composite document 120 representing information such as but not limited to an academic credentials/records, government documents, workforce credentials/records, legal contact, a certificate, driving license, and so on, is issued by an issuing server 110 governed by the issuing authority.

According to the embodiment, the issuing server 110 also generates the hash value of the corresponding document and publishes on the blockchain network 108. The cryptographic hash may be of a single document or a root hash of a merkle tree made of cryptographic hashes of multiple documents that are hashed and published on blockchain. The content of the document may include border design, logo, name of an entity and associated information, and so on. In particular, a cryptographic hash is generated based on the document using one or more algorithms such as SHA-256 hashing algorithm. The hash value along with the public key (interchangeably referred to as issue key) of the issuing authority may be sent to the blockchain network which acts as a public ledger for publication.

In an embodiment, the system 102 facilitates the creation/generation of composite digital document 120 and the verification of the authenticity of content of the composite document automatically. When the document needs to be verified, the user may click on button to provide as an input for initiating the verification. The composite document may include original content, meta data information embedded with the original content, and executable programmable instructions. The original content as well the meta data are configured as both the human readable information and machine readable information. In an example, the meta data information may be, by way of example but not limited to, organized according to the JavaScript Object Notation (or "JSON") or extensible markup language ("XML"). The digital composite document is provided with a link or button through which the user sends the request through its entity device 106 for initiating the verification. Upon clicking on the link or pressing the button, the system 102 initiates the process of verification. At the system 102, the embedded information such as hash values, issue keys, and so on are retrieved from the digital composite document and then transmitted to the verification server 112 for verification. The verification server 112 may compare the hash values received from the system 102 with the hash values stored at the blockchain network 108. In case, when the match is found, the document is considered as the authentic document. When the match is not found, the document is not considered as the authentic document. The verification results may be displayed on the computing device associated with the user.

In an embodiment, the system 102 may also send signing/public keys associated with the document along with the digital document to the verification server 112. The verification server 112 may receive the signing keys associated with the transaction details of the blockchain network and then compare with the published signing keys of the issuing authority. Based on the comparison, it is verified whether the signing keys associated with the document matches with the signing keys of the issuing authority.

Figure 2:
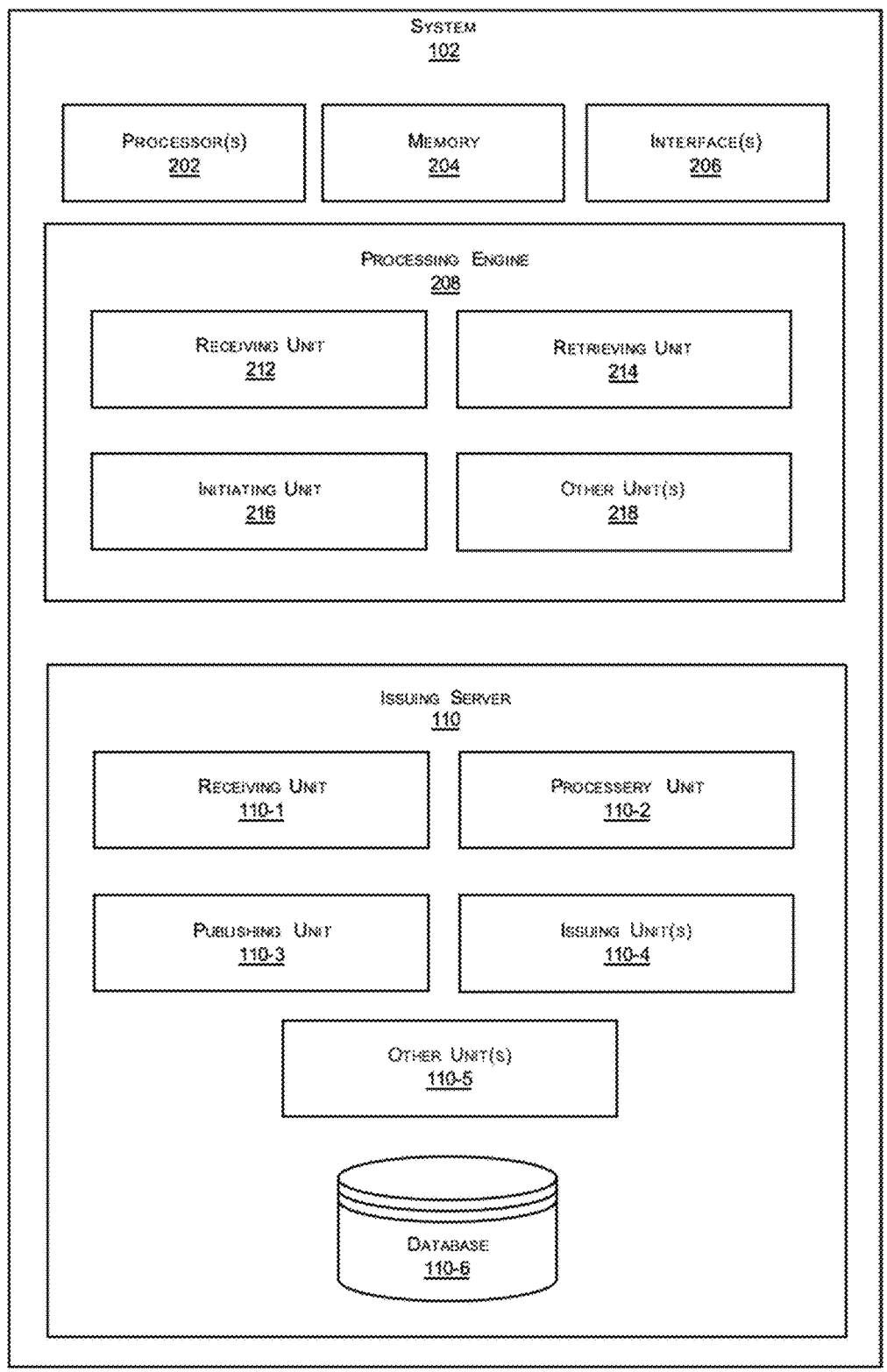
FIG. 2 illustrates exemplary functional components of the proposed system in accordance with an embodiment of the present disclosure.

FIG. 2 illustrates exemplary functional components of the system 102 in accordance with an embodiment of the present disclosure.

In an aspect, the system 102 may comprise one or more processor(s) 202. The one or more processor(s) 202 may be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 204 of the system 102. The memory 204 may store one or more computer-readable instructions or routines, which may be fetched and executed to create or share the data units over a network service. The memory 204 may comprise any non-transitory storage device including, for example, volatile memory such as RAM, or non-volatile memory such as EPROM, flash memory, and the like.

The system 102 may also comprise an interface(s) 206. The interface(s) 206 may comprise a variety of interfaces, for example, interfaces for data input and output devices, referred to as I/O devices, storage devices, and the like. The interface(s) 206 may facilitate communication of the system 102 with various devices coupled to the system 102 such as an input unit and an output unit. The interface(s) 206 may also provide a communication pathway for one or more components of the system 102. Examples of such components include, but are not limited to, processing engine(s) 208 and database 210.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208.

In an exemplary embodiment, the processing engine(s) 208 may include a receiving unit 212, a retrieving unit 214, initiating unit 216 and other units(s) 218.

It would be appreciated that units being described are only exemplary units and any other unit or sub-unit may be included as part of the system 102 or as part of the control unit of the system 102. These units too may be merged or divided into super-units or sub-units as may be configured.

Receiving Unit 212

The system 102 may include a receiving unit 212 that may be configured to receive an input from the user. The input may be received from the user through one or more a web link or button provided on the document. In other words, when the user clicks on the link or presses the button, a request is automatically raised for verification. The system 102 may receive the request from the user, where the request pertains to the initiation of verification.

Retrieving Unit 214

The system 102 may include a retrieving unit 214 that may be configured to retrieve embedded information pertaining to blockchain transaction details from the stored composite document 120, where the embedded information may include hash values, public keys, blockchain transaction ID, and so on. In an embodiment, the embedded information is configured as a structured data according to JSON, XML, HTML, and so on. In an embodiment, based on the characteristic of the embedded information, the retrieving unit 214 may retrieve the embedded information from the document.

Initiating Unit 216

The system 102 may include an initiating unit 216 that may be configured to send the retrieved document to the verification server to initiate the process of verification. The verification server may compare the hash values of the document with the hash obtained through the blockchain network. In an embodiment, the server may send the verification results to the user over the entity device.

Other Unit(s) 218

The system may include other unit(s) 218 may be configured to send signing keys associated with the issuing authority retrieved through the meta data to the verification server 112. The verification server may receive the signing keys retrieved through the meta data and then compare with the published signing keys of the issuing authority. Based on the comparison, it is verified whether the signing keys associated with the document matches with the issuing authority. The verification of the signing key is performed when the published signing keys of the issuing authority is available with the system. In an embodiment, the results of verification of signing keys can be displayed over the entity device 106 e.g., over a pop up window at the time of verification of the document.

The system 102 may include an issuing server 110 that may be implemented as a combination of hardware and programming (for example, programmable instructions) to implement one or more functionalities of the issuing server 110. In examples described herein, such combinations of hardware and programming may be implemented in several different ways. For example, the programming for the issuing server 110 may be processor executable instructions stored on a non-transitory machine-readable storage medium and the hardware for the issuing server 110 may comprise a processing resource (for example, one or more processors), to execute such instructions. In the present examples, the machine-readable storage medium may store instructions that, when executed by the processing resource, implement the issuing server 110. The database 110-6 may comprise data that is either stored or generated as a result of functionalities implemented by any of the components of the Issuing Server 110.

In an exemplary embodiment, the issuing server 110 may include a receiving unit 110-1, a processing unit 110-2, publishing unit 110-3, issuing unit 110-4, and other units(s) 110-5.

It would be appreciated that units being described are only exemplary units and any other unit or sub-unit may be included as part of the issuing server 110. These units too may be merged or divided into super-units or sub-units as may be configured.

The receiving unit 110-1 may be configured to receive a user input from a user. The user input may pertain to a request for providing the composite document (CD) 120. The processing unit 110-2 may be configured to generate the composite document (CD) 120. In particular, the processing unit 110-2 may be configured to embed the meta data with the original content. The processing unit also processes the document to generate the hash keys of the document, which then are published on the blockchain network 108 by the publishing unit 110-3. The issuing unit 110-4 may issue the composite document to the user.

Thus, the present disclosure provides the composite digital document containing data in a human readable/comprehensible as well as embedded information which is in machine readable format and human readable format. In this manner, the digital composite document is self-sufficient as it contains the original format as well as content as metadata or hidden field which has been hashed while issuing. It provides the user with an interface in the form of a button that initiates the verification of the content of the document in a user friendly manner. The process also eliminates the need to store any copy of the document's content online in any database in order to complete the verification. Additionally, the proposed system does not require any manually uploading any file on to the verification server. Moreover, the proposed system also verifies the signing keys of the issuing authority, as an additional step, when the published signing keys are available on the verification server. Signing Keys verification is an optional step, not a mandatory condition for the purpose of this application.

Figure 3:
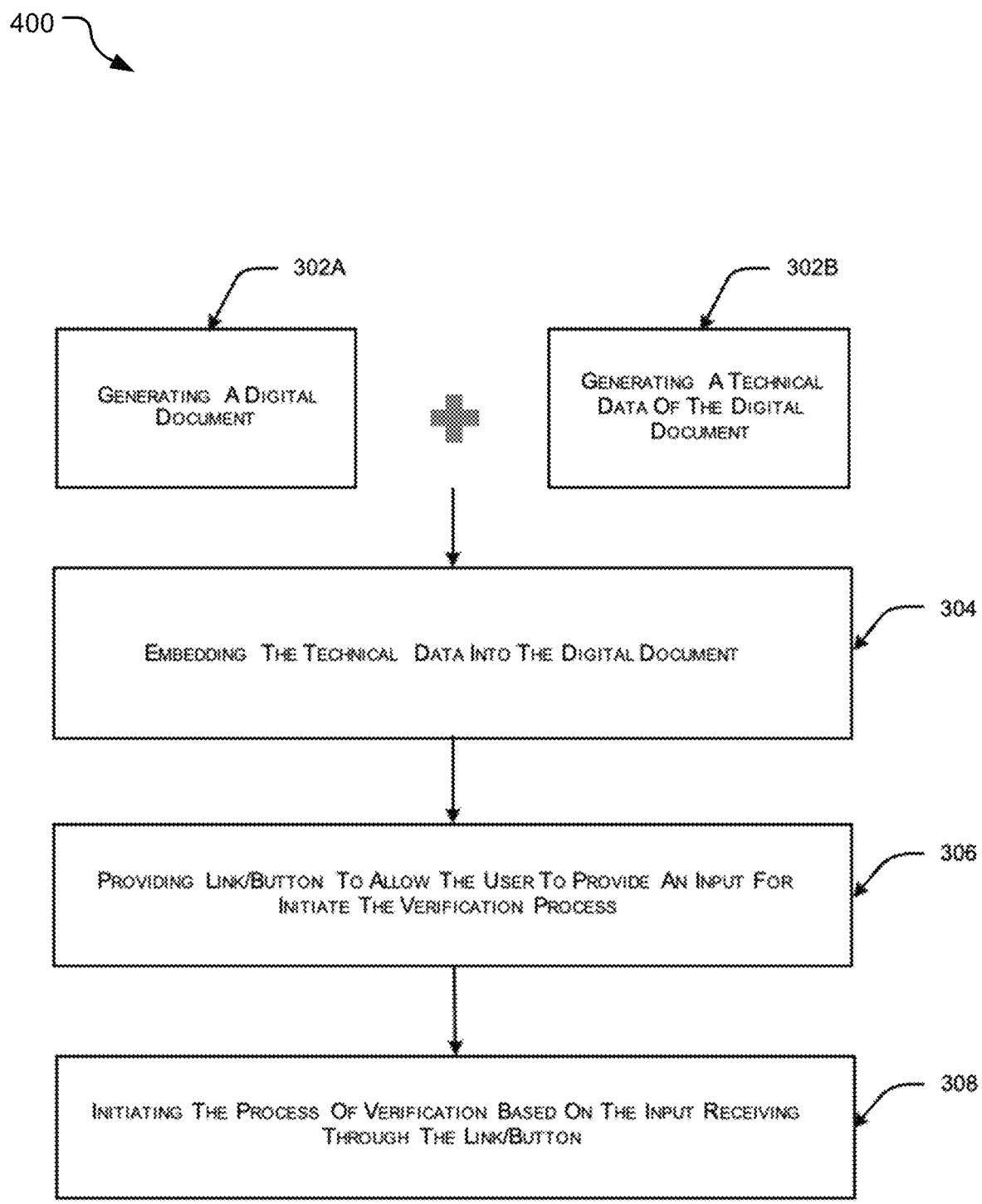
FIG. 3 illustrates a flow chart showing a method for creating the document & initiating the verification using the proposed system, in accordance with embodiments of the present disclosure.

FIG. 3 illustrates a flow chart showing a method for creating the document & initiating the verification using the proposed system, in accordance with embodiments of the present disclosure.

According to the method 300, the digital document is generated at step 302*a* and technical metadata of the digital document is generated at step 302*b*. Based on the generated document and the generated technical data, step 304 is performed i.e. the technical metadata pertaining to the blockchain transaction is embedded into the digital document in form of meta data so as to form the composite digital document. The link/button is provided for receiving input to initial the verification as per step 306. Upon receiving the input through the link/button, the verification gets initiated as per step 308. In particular, along with the input through the link/button, the digital composite document containing the original information and embedded blockchain transaction information and other metadata stored in the composite document may be retrieved. The embedded information is retrieved from the composite document and then the retrieved embedded information is sent to the verification server for the verification.

Figure 4:
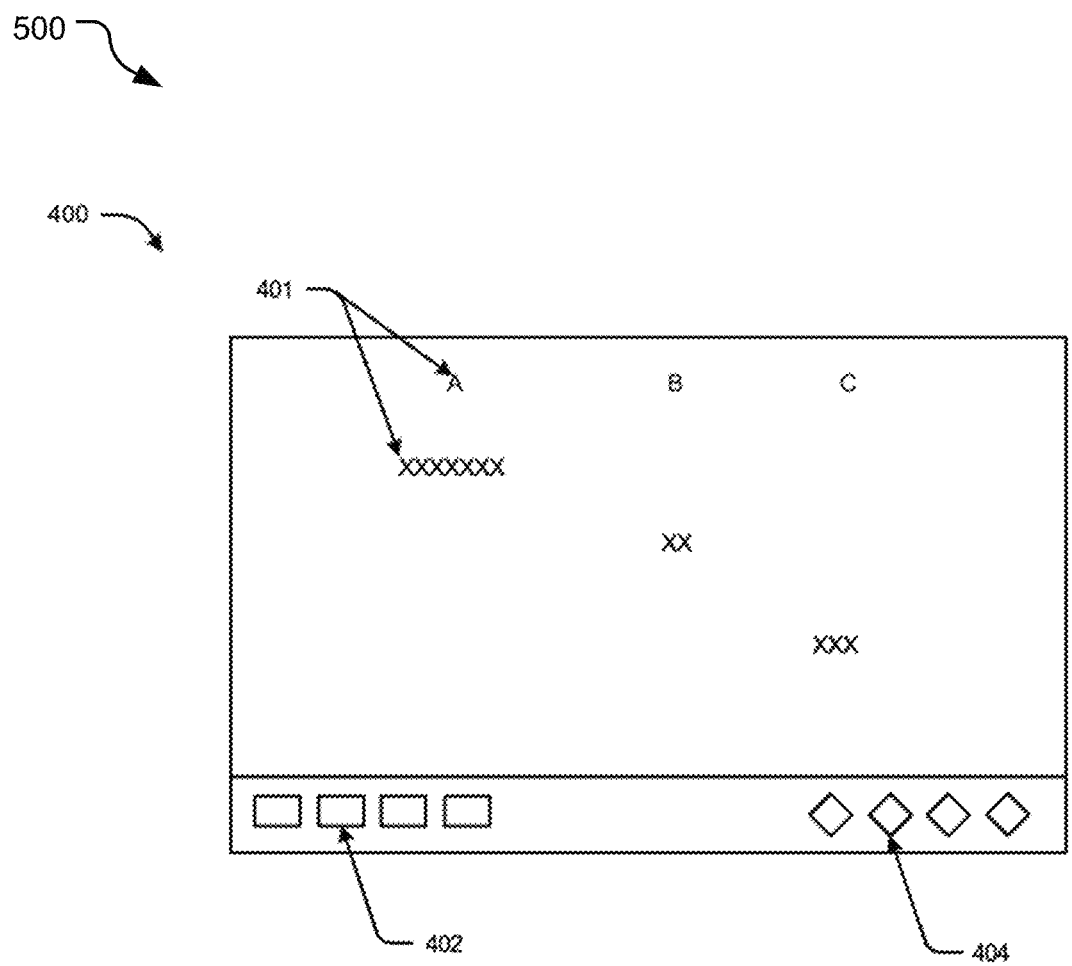
FIG. 4 illustrates an exemplary user interface displayed on a user computing device for verification, in accordance with embodiments of the present disclosure.

FIG. 4 illustrates an exemplary user interface also referred to as the human readable part of the composite document displayed on a user computing device, in accordance with embodiments of the present disclosure. As illustrated in FIG. 4, the user interface 400 may be configured to display the content to the user. The user interface 400 may display content 401 on the computing device as shown in FIG. 4. The user interface 400 may also include one or more first input means 402 for initiating verification and one or more second input means 404 allowing the user to share the content on any of the social media platforms. In an exemplary embodiment, the one or more first input means 402 may include the first link/button configured on the left side of the document over the interface, whereas the one or more second input means 404 may include second link/buttons configured on the right side of the document over the interface. However, it would be easily understood by a person skilled in the art that the one or more input means 402 and the one or more second input means 404 may be configured anywhere on the document over the interface.

Figure 5:
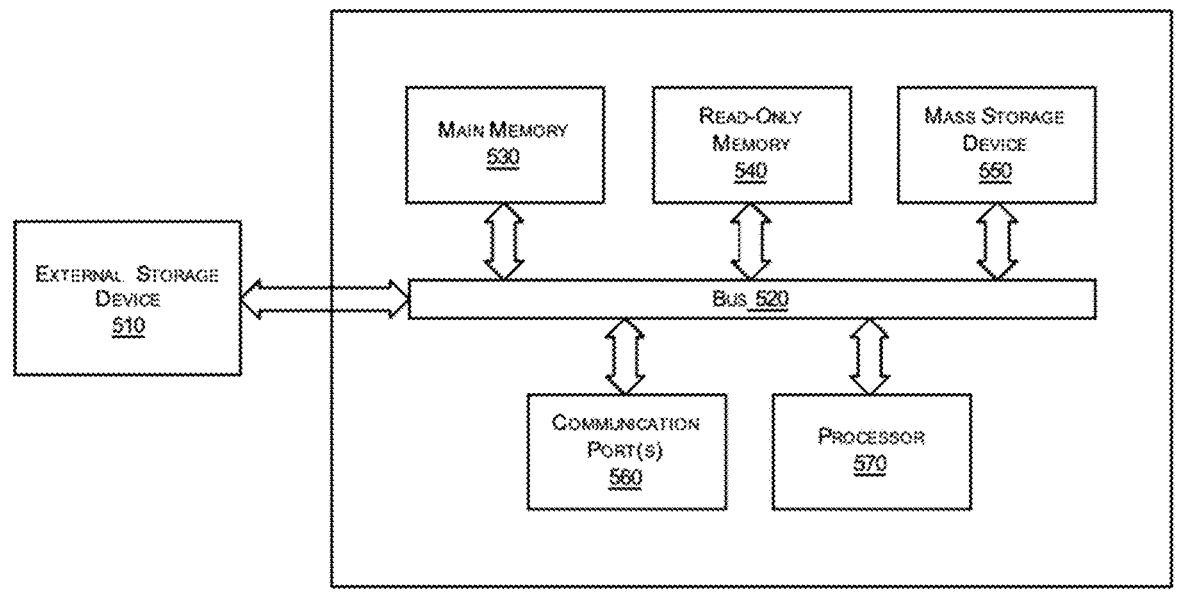
FIG. 5 illustrates an exemplary computer system to implement the proposed system in accordance with embodiments of the present disclosure.

FIG. 5 illustrates an exemplary computer system 500 to implement the proposed system in accordance with embodiments of the present disclosure.

As shown in FIG. 5, computer system can include an external storage device 510, a bus 520, a main memory 530, a read only memory 540, a mass storage device 550, communication port 560, and a processor 570. A person skilled in the art will appreciate that computer system may include more than one processor and communication ports. Examples of processor 570 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 570 may include various modules associated with embodiments of the present invention. Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 560 may be chosen depending on a network, such a Local Area Network (LAN), Wide Area Network (WAN), or any network to which computer system connects.

Memory 530 can be Random Access Memory (RAM), or any other dynamic storage device commonly known in the art. Read only memory 540 can be any static storage device(s) e.g., but not limited to, a Programmable Read Only Memory (PROM) chip for storing static information e.g., start-up or BIOS instructions for processor 570. Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 520 communicatively couples processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with computer systems. Other operator and administrative interfaces can be provided through network connections connected through communication port 560. External storage device 510 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Additionally or alternatively, the functions of the various elements shown in the figures may be provided through the use of shared computing infrastructure in the cloud. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, to avoid obscuring the present invention.

While the foregoing describes various embodiments of the disclosure, other and further embodiments of the disclosure may be devised without departing from the basic scope thereof. The disclosure is not limited to the described embodiments, versions or examples, which are included to enable a person having ordinary skill in the art to make and use the disclosure when combined with information and knowledge available to the person having ordinary skill in the art.

What is claimed is:

1. A method for creating the composite document and verifying of digital documents on a distributed ledger without maintaining or storing, on any server/verification portal, any of the content of the said digital document, that needs to be verified, the method comprising:
   receiving a request for verification from a user through at least one of a web link or a button provided on a composite document, the composite document containing original content and corresponding embedded information in the metadata is also received along with the request;
   upon a receipt of the composite document, retrieving the embedded information from the metadata of the received composite document based on the characteristics of the embedded information;
   sending the received composite document to a verification server to initiate the process of verification;
   conducting the process of verification, using only the content/metadata received with the request on the verification server without needing to compare it with any stored information related to any of the content of the said digital document, on any server/verification portal, that needs to be verified;
   upon verification of the authenticity of the content, providing the results to the system;
   and
   displaying the results over a user interface.

2. The method of claim 1, further comprising along with the authenticity of the content, verifying the issue key of the issuing authority, which issues the digital composite document.

3. The method of claim 1, wherein the distributed ledger is a blockchain.

* * * * *